(12) United States Patent
Beard

(10) Patent No.: US 9,139,344 B2
(45) Date of Patent: Sep. 22, 2015

(54) PACKING TAPE

(71) Applicant: Alison Beard, Lebanon, PA (US)

(72) Inventor: Alison Beard, Lebanon, PA (US)

( * ) Notice: Subject to any disclaimer, the term of this patent is extended or adjusted under 35 U.S.C. 154(b) by 7 days.

(21) Appl. No.: 14/277,454

(22) Filed: May 14, 2014

(65) Prior Publication Data

US 2014/0342114 A1    Nov. 20, 2014

Related U.S. Application Data

(60) Provisional application No. 61/824,105, filed on May 16, 2013.

(51) Int. Cl.
| | |
|---|---|
| *B65D 63/10* | (2006.01) |
| *C09J 7/02* | (2006.01) |
| *B65D 5/02* | (2006.01) |

(52) U.S. Cl.
CPC .......... *B65D 63/1009* (2013.01); *B65D 5/0236* (2013.01); *C09J 7/0275* (2013.01); *C09J 2201/20* (2013.01); *C09J 2423/106* (2013.01); *Y10T 428/15* (2015.01)

(58) Field of Classification Search
CPC .............................. C09J 2201/20; B32B 3/266
USPC .................. 428/43, 137, 906, 136; 229/123.2
See application file for complete search history.

(56) References Cited

U.S. PATENT DOCUMENTS

| | | | |
|---|---|---|---|
| 1,032,026 A | | 7/1912 | Roden |
| 1,827,636 A | * | 10/1931 | Ames .......................... 229/123.2 |
| 2,771,385 A | | 11/1956 | Humphner |
| 3,360,120 A | | 12/1967 | Getzin |
| 4,647,485 A | | 3/1987 | Nelson |
| 5,366,775 A | | 11/1994 | Kao |
| 5,922,402 A | | 7/1999 | Speeney |

\* cited by examiner

*Primary Examiner* — Alexander Thomas
(74) *Attorney, Agent, or Firm* — McNees, Wallace & Nurick LLC

(57) ABSTRACT

Provided are a packing tape, and a method of forming the same, the packing tape including a flexible member having a first surface and a second surface defining a body therebetween having a thickness, a width and a length. The packing tape further includes a tear-away member defined by a first row and a second row of a plurality of perforated members which are parallel to each other and centrally located along the width of the flexible member. The packing tape also includes an adhesive on the second surface of the flexible member.

18 Claims, 3 Drawing Sheets

PACKING TAPE

CROSS-REFERENCE TO RELATED APPLICATIONS

This application claims the benefit of U.S. Provisional Patent Application No. 61/824,105, filed May 16, 2013, entitled "Packing Tape," the disclosures of which are incorporated by reference in its entirety and made part of the present U.S. utility patent application for all purposes.

BACKGROUND

This application generally relates to packing tapes, and more particularly to packing tapes which include perforated members allowing users to easily tear the packing tapes to open a package.

Packing tapes are shown in the prior art for sealing letters, cans, cartons, or for wrapping and sealing packages of various descriptions such as newspapers, periodicals and the like. In U.S. Pat. No. 1,032,026 to Roden, issued Jul. 9, 1912, a sealing strip is shown for use in sealing a can or carton. A thread or cord is designed to run along the longitudinal length of the sealing strip so that the can or carton can be opened by pulling on the free end of the cord, causing it to fracture the sealing strip along the length thereof. The thread or cord is located on the bottom surface of the tape and is secured in position by a thin strip of paper which extends longitudinally on the bottom surface of the sealing strip over the cord. The strip of paper is pasted flat to the bottom surface of the sealing strip.

U.S. Pat. No. 2,771,385 to Humphner, issued Nov. 20, 1956, shows a draw tape having a tear filament located on the underside of the tape which extends longitudinally of the underside and which is united thereto. U.S. Pat. No. 3,360,120 to Getzin, issued Dec. 26, 1967, shows a length of packaging material for packaging filter elements which has a tear ribbon fastened to the bottom surface of the packaging material to facilitate tearing for opening the package.

In each of the above references, a cord or filament is pasted or otherwise affixed to the bottom surface of the tape or packaging strip, adding to the cost and complexity of manufacture. Also, the tear area or portion of the tape is not clearly visible to the user from the top surface of the tape.

It would be desirable to provide easier to use and more reliable packing tapes. Intended advantages of the disclosed articles of manufacture and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

In one embodiment, a packing tape is provided. The packing tape includes a flexible member having a first surface and a second surface defining a body therebetween having a thickness, a width and a length. The packing tape further includes a tear-away member defined by a first row and a second row of a plurality of perforated members, the first row and the second row being parallel to each other and centrally located along the width of the flexible member. The packing tape also includes an adhesive on the second surface of the flexible member.

In another embodiment, a packing tape is provided. The packing tape includes a flexible member having a first surface and a second surface defining a body therebetween having a thickness, a width and a length. The packing tape further includes a tear-away member defined by a first row and a second row of a plurality of perforated members, the first row and the second row being parallel to each other and centrally located along the width of the flexible member. The plurality of perforated members extend through the thickness of the body and include a first portion and a second portion. The first portion is parallel to the length of the flexible member. The second portion abuts the first portion and extends perpendicular to the first portion away from a center of the width of the flexible member. The packing tape also includes an adhesive on the second surface of the flexible member. The adhesive is adjacent to the second portion distal from the first portion and extends away from the center of the width of the flexible member. The plurality of perforated members defines an adhesive free zone encompassing and extending from the first row to the second row of the plurality of perforated members.

In yet another embodiment, a method for forming a packing tape is provided. The method includes providing a flexible member having a first surface and a second surface defining a body therebetween having a thickness, a width and a length. The method further includes forming in the flexible member a first row and a second row of a plurality of perforated members, the first row and the second row being parallel to each other and centrally located along the width of the flexible member, and defining a tear-away member. The method also includes applying an adhesive on the second surface of the flexible member.

Advantages of embodiments of the present invention include packing tapes that can be used on hand-held and mechanical tape dispensers to provide a secure closure for box packages. Embodiments of the present invention allow the end user to safely and easily open the package by hand, without the use of any sharp object or cutting tool. Another advantage of packing tapes according to an embodiment of the present invention is that they can be made in multiple widths. Yet another advantage is that packing tape of the present invention provides uniformity because the first and second row of the plurality of perforated members are positioned on the adhesive free zone abutted to the outer adhesive strip. Another advantage of an embodiment of the invention is that the adhesive free zone, first portion and second portion create a row of tear tabs that facilitate a lateral tear away from the center of the packing tape to open flaps on boxes or packages with ease, once the tear away member is torn from the package while opening.

Advantages of certain embodiments of the invention described herein include that the second portion of the plurality of perforated members is abutted to, but not extended into, the adhesive area of the packing tape. Another advantage of an embodiment is the placement of the first and second portion of the plurality of perforated members on the adhesive free zone of the flexible member, which allows the packing tape to be manufactured onto a roll that can be unrolled without the adhesive adhering to, and prematurely tearing the underlying perforated members upon being unrolled. Yet another advantage of an embodiment of the invention is that the plurality of perforated members are cut so as to extend through the thickness of the body of the flexible member. A further advantage of an embodiment is that the first portion of the plurality of perforated members create a tear-away member that can be pulled/torn/removed from the entire length of the packing tape, thus transforming the second portion of the plurality of perforated members into successive rows of lateral tear tabs that run the entire length of the packing tape and which are perpendicular to the tear-away member that runs the entire length of the packing tape. Yet another advantage of an embodiment of the invention is that the length of each newly created tear tab, in a successive row of tear tabs that run the entire length of the packing tape, ensures that a tear tab will always be at, or near to, wherever a lateral tear in the packing tape must be made by the end user when opening a package closed with the packing tape of the present invention. Another advantage of an embodiment is the newly created successive tear tabs run the entire length of the packing tape allowing the packing tape to be torn laterally with little or minimal force.

Alternative exemplary embodiments relate to other features and combinations of features as may be generally recited in the claims.

DETAILED DESCRIPTION OF THE EXEMPLARY EMBODIMENTS

Figure 1:
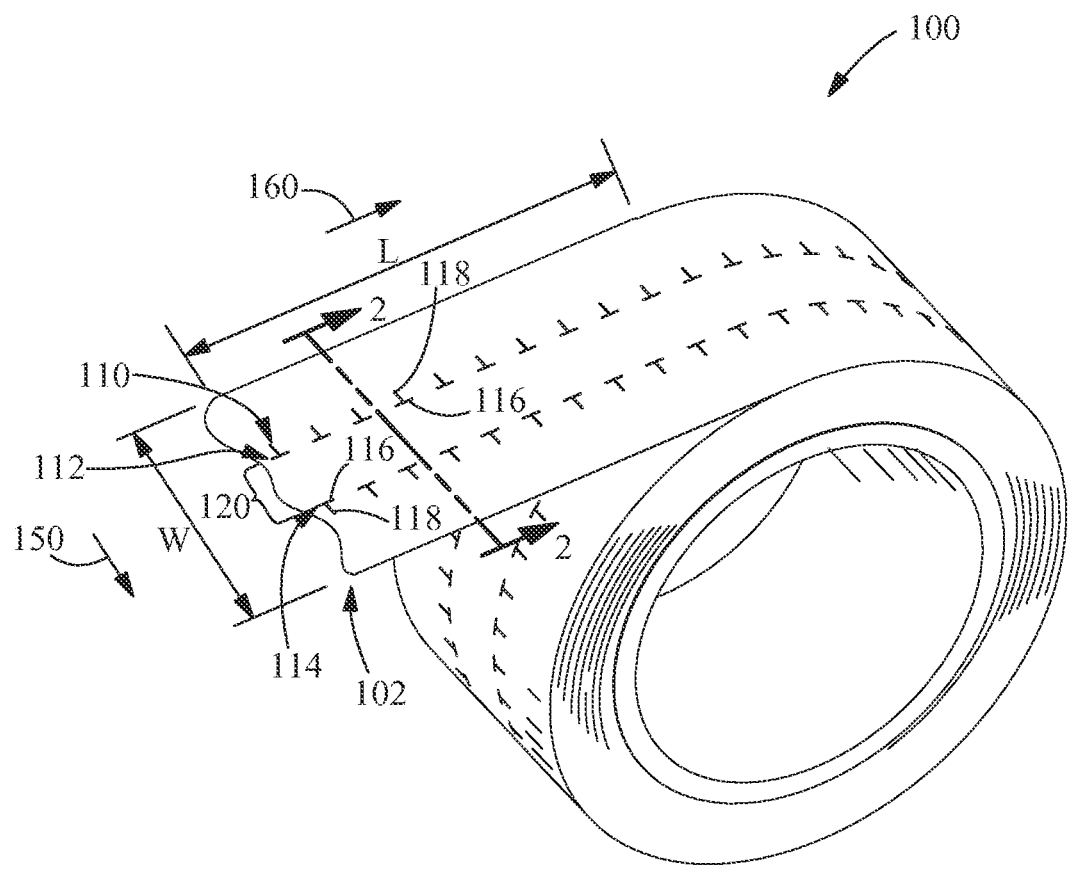
FIG. 1 is a perspective view of a packing tape according to an exemplary embodiment of the present disclosure.
Figure 2:
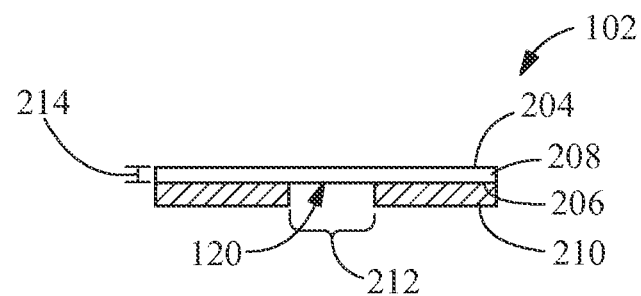
FIG. 2 is section view of the packing tape taken along the line 2-2 of FIG. 1 according to an exemplary embodiment of the present disclosure.

Referring to FIG. 1, a packing tape 100 including a flexible member 102 having a thickness 214 and a length "L" is shown, according to an embodiment of the invention. The flexible member 102 has a first surface 204 and a second surface 206 forming a body 208 therebetween having a thickness 214 (see FIG. 2). Returning to FIG. 1, the packing tape 100 further includes a tear-away member 120 defined by a first row 112 and a second row 114 of a plurality of perforated members 110, the first row 112 and the second row 114 being parallel to each other and centrally located along the width "W" of the flexible member 102. Referring again to FIG. 2, the packing tape 100 also includes an adhesive 210 on the second surface 206 of the flexible member 102. A method for forming the packing tape 100 may include providing the flexible member 102, forming in the flexible member 102 the first row 112 and the second row 114 of the plurality of perforated members 110, and applying the adhesive 210 on the second surface 206 of the flexible member 102.

In one embodiment, the adhesive 210 is applied adjacent to the second portion 118 distal from the first portion 116, and extends away from the center of the width "W" of the flexible member 102. In a further embodiment, the plurality of perforated members 110 define an adhesive free zone 212 encompassing and extending from the first row 112 to the second row 114 of the plurality of perforated members 110.

The flexible member 102 may be made from any suitable material, including, but not limited to, paper, plastic film, cloth, cardboard, metal foil, polypropylene, polyester or other plastic, graphene, or a combination thereof. One suitable material, for exemplary purposes only, for flexible member 102 is bi-axially oriented polypropylene (BOPP) film.

In one embodiment, the plurality of perforated members 110 extend through the thickness 214 of the body 208. Returning to FIG. 1, in another embodiment, the plurality of perforated members 110 include a first portion 116 and a second portion 118. The first portion 116 is parallel to the length "L" of the flexible member 102. The second portion 118 abuts the first portion 116, and extends perpendicular to the first portion 116 away from a center of the width "W" of the flexible member 102.

In a further embodiment, the second portion 118 abuts the first portion 116 at about a midpoint of the first portion 116. This configuration of the first portion 116 and the second portion 118 creates "T" shaped individual perforated members 110. The central placement of second portion 118 to first portion 116 to form a "T" enables the tear-away member 120 to be torn either in the longitudinal direction 160 or against the longitudinal direction 160. For example, two aligned, but opposing rows of "T" shaped perforated members 110 cause a simultaneous longitudinal stress tear to occur at the one end of each set of inner facing first portion 116 perforations, and reduces premature, lateral stress tearing of the second portion 118 (in comparison to an L-shaped perforated member 110). In addition, the central placement of the second portion 118 to the first portion 116 enables the removal of tear-away member 120 from a package sealed with the packing tape 100 in either direction, eliminating the need to include instructions regarding from which end the tear-away member 120 must be removed.

The first portion 116 may allow a person to easily tear through the length "L" of the packing tape 100 in the longitudinal direction 160 without any special tools, whereas the second portion 118 may allow a person to easily tear through width "W" of the packing tape 100 in the lateral direction 150 without any special tools. In a further embodiment, the tear-away member 120 is separable from the flexible member 102 by hand. As used herein, "by hand" means without any tools other than a person's hands and with the typical hand strength of an ordinary person. The inclusion of both the first portion 116 and the second portion 118, allowing the packing tape 100 to be torn in both the lateral direction 150 and the longitudinal direction 160 without special tools or even by hand, enables a person to open a package closed with the packing tape 100 by removing the tear-away member 120 in the longitudinal direction 160 and then by making tears in the lateral direction 150 through the second portion 118 of the perforated members 110 to open the flaps of the package.

Figure 3:
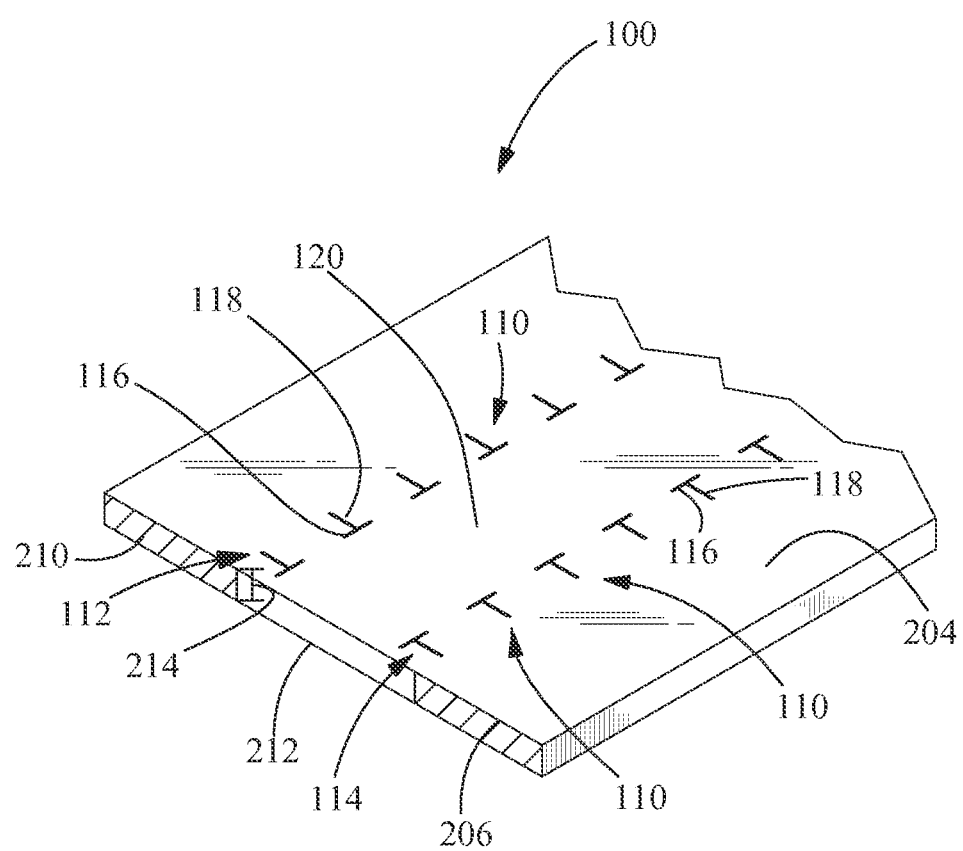
FIG. 3 is a perspective view of the packing tape according to an exemplary embodiment of the present disclosure.

As shown in FIG. 3, in one embodiment the bottom point of every "T" perforation (the second potion 118 of each perforated member 110) is abutted to, but not extended into, the adhesive 210 of packing tape 100. Placement of each of the plurality of perforated members 110 or "T" perforation on the adhesive free zone 212 allows the packing tape 100 to be manufactured onto a roll that can be unrolled without the adhesive 210 adhering to, and prematurely tearing the underlying perforated members 110 or "T" perforation upon being unrolled.

Figure 4:
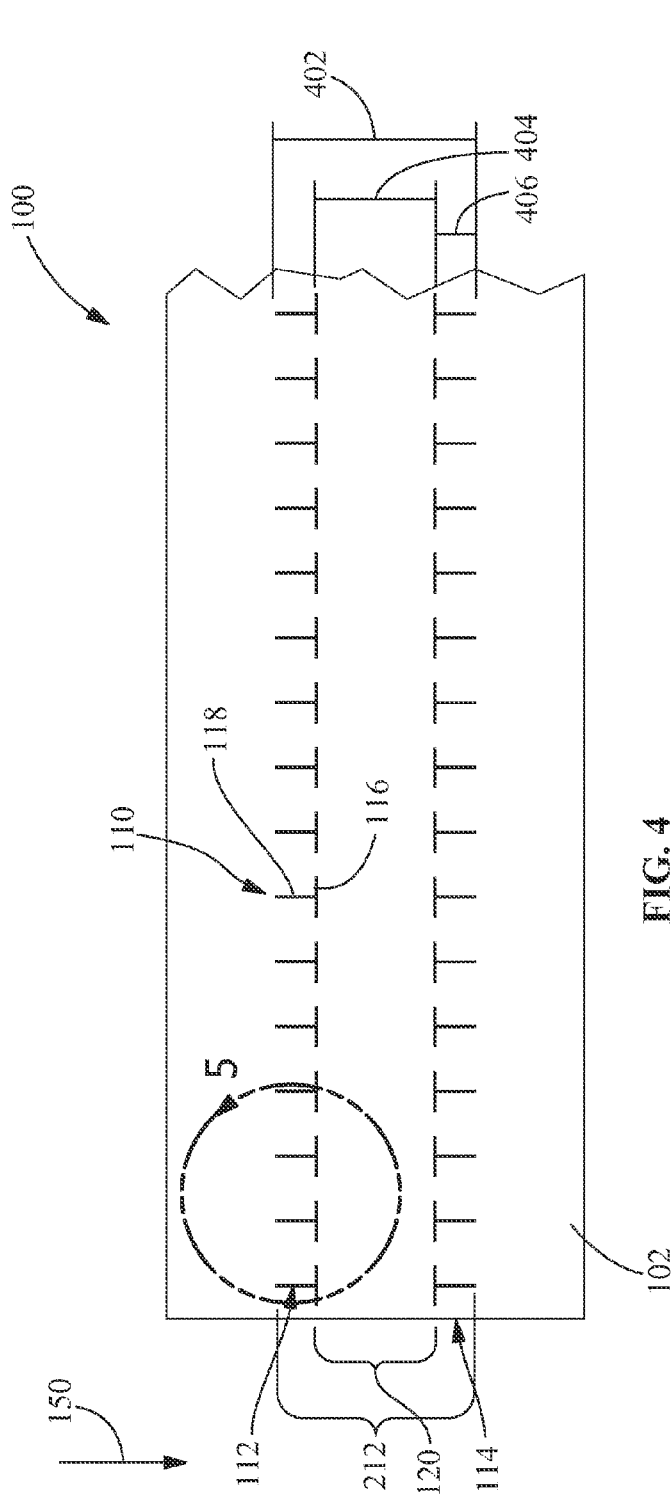
FIG. 4 is a top view of the packing tape according to an exemplary embodiment of the present disclosure.

Referring to FIG. 4, exemplary dimensions are provided for the plurality of perforated members 110, the tear-away member 120, and the adhesive free zone 212. The first row 112 of the plurality of perforated members 110 are parallel to the second row 114 of the plurality of perforated members 110, and the first row 112 and the second row 114 define the adhesive free zone 212. The adhesive free zone 212 may run the entire length "L" of the packing tape 100. In one embodiment, the adhesive free zone has a width 402 of about ¼ inches to about 1 inches, alternatively about ½ inches to about ⁹⁄₁₀ inches, alternatively about ¾ inches. The first row 112 and the second row 114 define a width 404 of the tear-away member 120. In one embodiment, the width 404 of the tear-away member 120 is about 1/8 inches to about 1/2 inches, alternatively about 1/4 inches to about 9/20 inches, alternatively about 3/8 inches. Each of the perforated members 110 defines a height 406 of the perforated member 110 corresponding to the length of the second portion 118. In one embodiment, the height 406 of each of the perforated members 110 is about 1/16 inches to about 1/4 inches, alternatively about 1/8 inches to about 9/40 inches, alternatively about 3/16 inches. In one, embodiment, the packing tape 100 includes a plurality of perforated members 110 and the tear-away members 120 and the adhesive 210 across the whole length "L" and width "W" of packing tape 100.

Figure 5:
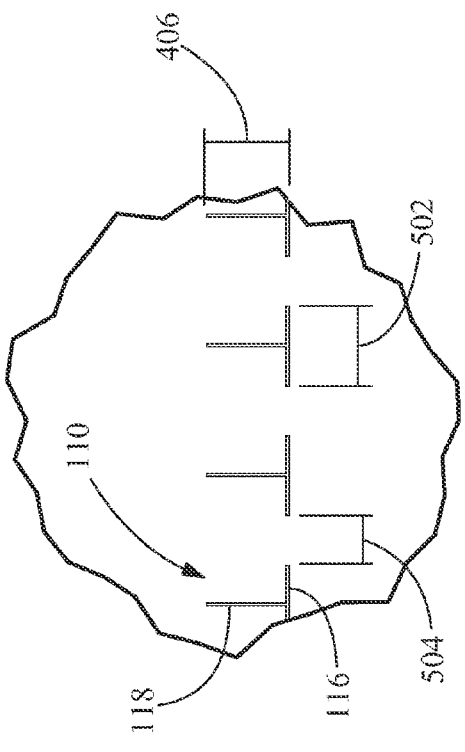
FIG. 5 is a top view of perforated members of FIG. 4 of the packing tape according to an exemplary embodiment of the present disclosure.

FIG. 5 provides exemplary dimensions of the plurality of perforated members 110 and the spacing 504 between each of the perforated members 110. In one embodiment, the width 502 of each of the perforated members 110, which corresponds to the width of the first portion, is about 1/8 inches to about 1/2 inches, alternatively about 1/4 inches to about 9/20 inches, alternatively about 3/8 inches. The width 502 of each of the perforated members 110 ensures that a perforated member 110 will be at, or near to, wherever a tear in the lateral direction 150 in the packing tape 100 needs to be made by the end user when opening a package closed with the packing tape 100. In another embodiment, the spacing 504 between the plurality of perforated members 110 in either the first row 112 or the second row 114 is about 1/48 inches to about 3/8 inches, alternatively about 1/40 inches to about 3/50 inches, alternatively about 1/16 inches. The width 502 of each of the perforated members 110 running entire length of the packing tape 100 and the spacing 504 between the plurality of perforated members 110 enables the packing tape 100 to be torn in a lateral direction 150 with little or minimal force, and therefore without special tools or even by hand.

It should be understood that the application is not limited to the details or methodology set forth in the above description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

What is claimed is:

1. A packing tape, comprising:
  a flexible member having a first surface and a second surface defining a body therebetween having a thickness, a width and a length;
  a tear-away member defined by a first row and a second row of a plurality of perforated members, the first row and the second row being parallel to each other and centrally located along the width of the flexible member, wherein the plurality of perforated members include a first portion and a second portion, and wherein:
   the first portion is parallel to the length of the flexible member;
   the second portion abuts the first portion; and
   the second portion extends perpendicular to the first portion away from a center of the width of the flexible member; and
  an adhesive on the second surface of the flexible member.

2. The packing tape of claim 1, wherein the plurality of perforated members extend through the thickness of the body.

3. The packing tape of claim 1, wherein the adhesive is adjacent to the second portion distal from the first portion and extends away from the center of the width of the flexible member.

4. The packing tape of claim 1, wherein the second portion abuts the first portion at about a midpoint of the first portion.

5. The packing tape of claim 1, wherein the plurality of perforated members define an adhesive free zone encompassing and extending from the first row to the second row of the plurality perforated members.

6. The packing tape of claim 1, wherein the flexible member is bi-axially oriented polypropylene film.

7. The packing tape of claim 1, wherein the tear-away member is separable from the flexible member by hand.

8. The packing tape of claim 1, wherein the tear-away member has a width of about 1/8 inches to about 1/2 inches.

9. The packing tape of claim 1, wherein each of the perforated members has a height of about 1/16 inches to about 1/4 inches.

10. A packing tape, comprising:
  a flexible member having a first surface and a second surface defining a body therebetween having a thickness, a width and a length;
  a tear-away member defined by a first row and a second row of a plurality of perforated members, the first row and the second row being parallel to each other and centrally located along the width of the flexible member, wherein the plurality of perforated members:
   extend through the thickness of the body; and
   include a first portion and a second portion, wherein:
    the first portion is parallel to the length of the flexible member;
    the second portion abuts the first portion; and
    the second portion extends perpendicular to the first portion away from a center of the width of the flexible member; and
  an adhesive on the second surface of the flexible member, wherein the adhesive is adjacent to the second portion distal from the first portion and extends away from the center of the width of the flexible member, the plurality of perforated members defining an adhesive free zone encompassing and extending from the first row to the second row of the plurality of perforated members.

11. The packing tape of claim 10, wherein the second portion abuts the first portion at about a midpoint of the first portion.

12. The packing tape of claim 10, wherein the flexible member is bi-axially oriented polypropylene film.

13. The packing tape of claim 10, wherein the tear-away member is separable from the flexible member by hand.

14. The packing tape of claim 10, wherein the tear-away member has a width of about 1/8 inches to about 1/2 inches.

15. The packing tape of claim 10, wherein each of the perforated members has a height of about 1/16 inches to about 1/4 inches.

16. A method for forming a packing tape, comprising:
  providing a flexible member having a first surface and a second surface defining a body therebetween having a thickness, a width and a length;
  forming in the flexible member a first row and a second row of a plurality of perforated members, the first row and the second row being parallel to each other and centrally located along the width of the flexible member, and defining a tear-away member, wherein the plurality of perforated members include a first portion and a second portion, and wherein:

the first portion is parallel to the length of the flexible member;

the second portion abuts the first portion; and the second portion extends perpendicular to the first portion away from a center of the width of the flexible member; and applying an adhesive on the second surface of the flexible member.

17. The method of claim 16, wherein the plurality of perforated members extend through the thickness of the body.

18. The method of claim 9, wherein the adhesive is applied adjacent to the second portion distal from the first portion and extends away from the center of the width of the flexible member, the plurality of perforated members defining an adhesive free zone encompassing and extending from the first row to the second row of the plurality of perforated members.

* * * * *